(No Model.)

A. E. BARBER.
FRUIT PRESERVER.

No. 370,035. Patented Sept. 20, 1887.

Witnesses
Geo. Thorfer
J. W. Garner

Inventor
Mrs. A. E. Barber
By her Attorneys,
C. A. Lowrie

UNITED STATES PATENT OFFICE.

ANNA E. BARBER, OF BRODHEAD, WISCONSIN.

FRUIT-PRESERVER.

SPECIFICATION forming part of Letters Patent No. 370,035, dated September 20, 1887.

Application filed March 23, 1887. Serial No. 232,208. (No model.)

*To all whom it may concern:*

Be it known that I, ANNA E. BARBER, a citizen of the United States, residing at Brodhead, in the county of Green and State of Wisconsin, have invented a new and useful Improvement in Devices for Canning and Preserving Fruits, Meats, &c., of which the following is a specification.

My invention relates to an improvement in devices for canning and preserving fruits, meats, &c.; and it consists in the peculiar construction and combination of devices, that will be more fully set forth hereinafter, and particularly pointed out in the claims.

Figures 1, 2:
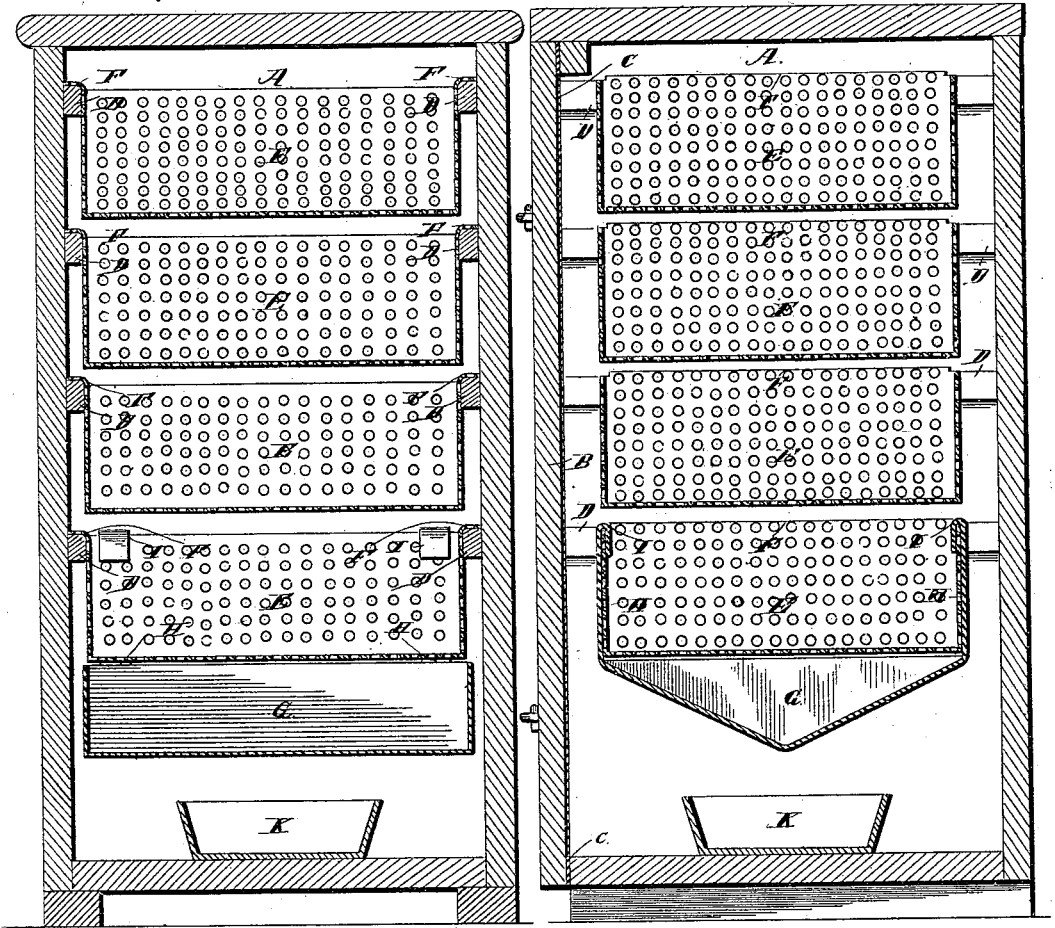
Figure 3:
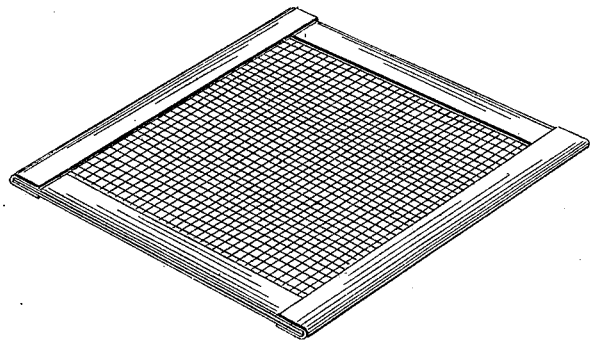

In the drawings, Figure 1 is a vertical sectional view of a preserving device embodying my improvements. Fig. 2 is a similar view of the same, taken on a plane at right angles to Fig. 1. Fig. 3 is a detail view of a modification.

A represents a case, cabinet, or closet, which is provided with a hinged door, B, on one side. The edges of the case, cabinet, or closet against which the door closes are provided with strips of rubber, C, or other suitable elastic material adapted to effect an air-tight joint when the door is closed and fastened. On opposite sides of the case, cabinet, or closet are arranged a series of supporting-cleats, D.

E represents a series of trays or drawers, which are made of perforated material and are provided at their upper edges on opposite sides with horizontal projecting flanges F, that are adapted to rest upon the upper sides of the cleats D, and thereby suspend the perforated trays in the case one above the other, as shown.

G represents a drip-pan, which is provided with vertical supporting-arms H at its corners, the said arms having hooks I at their upper ends adapted to engage the upper edges of opposite sides of the lower tray E, and thereby suspend the said drip-pan from the said tray.

K represents a pan which is made of sheet or plate metal, and is adapted to be placed in the lower side of the case or cabinet below the drip-pan G.

The operation of my invention is as follows: The fruit to be canned is placed in the series of trays, and the cans in which the fruit is to be inclosed are placed in the bottom of the case or cabinet around the pan K. The latter is then filled with a quantity of live coals, and a small quantity of sulphur is sprinkled over the coals, and the door B is then closed and fastened, so as to exclude air from the interior of the case or cabinet. This door is kept closed for an hour or more, so as to subject the fruit to the action of the sulphurous fumes. The door is then opened and the fruit in the trays is packed in the cans or jars, and the latter are then hermetically sealed. Fruit preserved in this manner is preserved fresh and sweet and retains its natural flavor and aroma.

The drip-pan G serves to collect the juices which flow from the fruit while being fumigated, and a suitable quantity of the juice thus collected is poured into each can with the fruit. A suitable quantity of sugar and water is placed in each can before putting the cans in the case or cabinet.

If it is desired to preserve meats when in transportation on railway-cars or steamboats, or when stored before being sold or placed upon the market, perforated shelves, such as illustrated in Fig. 3, are placed on the cleats D in lieu of the trays E, and the meat is placed upon the said shelves and subjected to the action of sulphurous fumes, as before described. The meat thus treated will be preserved fresh and sweet as long as the door remains closed.

Having thus described my invention, I claim—

The combination of the perforated tray and the drip-pan, having the integral vertical arms provided with hooks at their upper ends to engage the edges of the tray, substantially as set forth.

In testimony that I claim the foregoing as my own I have hereto affixed my signature in presence of two witnesses.

ANNA E. BARBER.

Witnesses:
A. N. RANDALL,
LOUISA TAYLOR.